Figure 1:
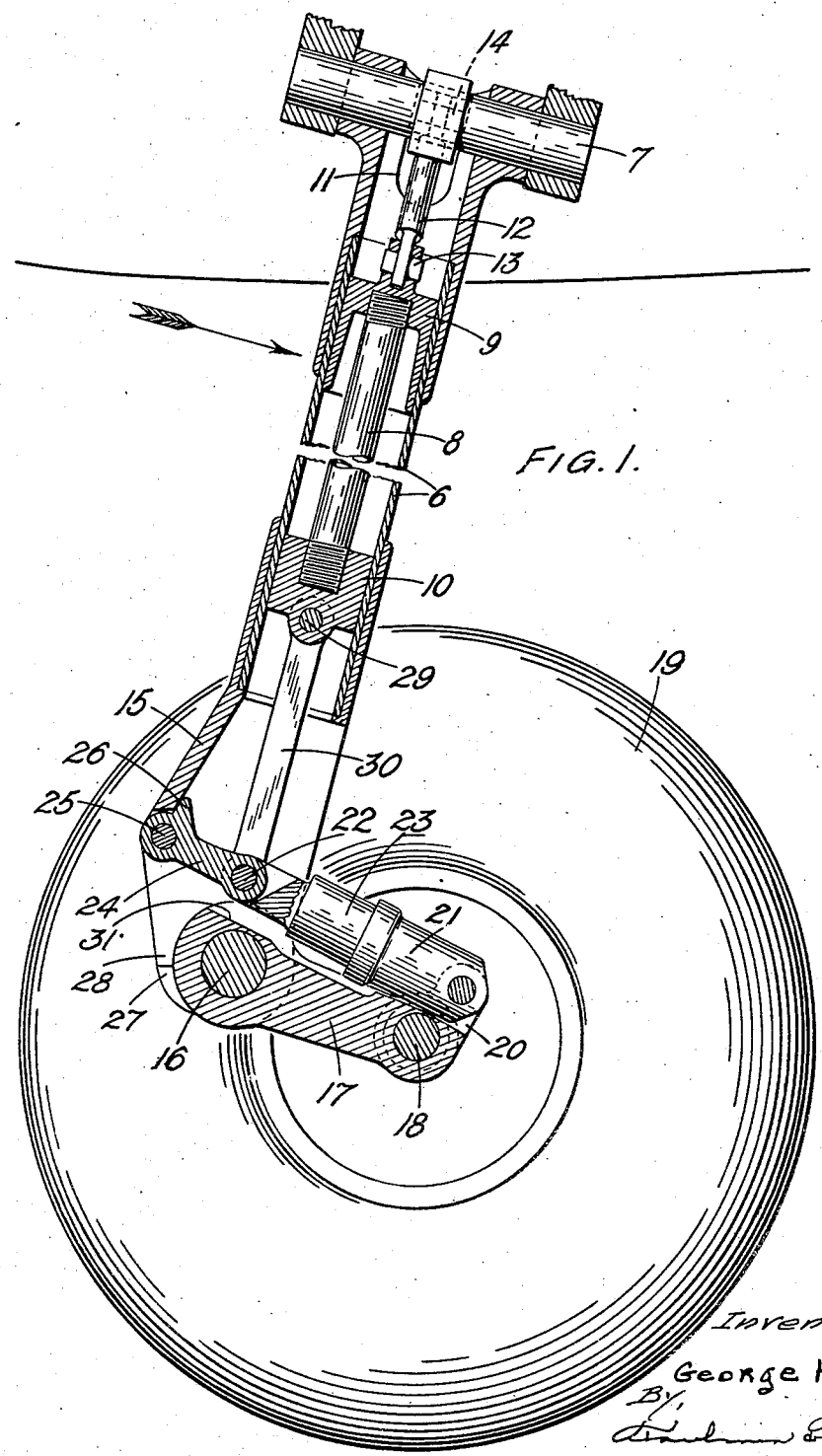

May 18, 1943. G. H. DOWTY 2,319,446
RETRACTABLE UNDERCARRIAGE FOR AIRCRAFT
Filed March 4, 1940 3 Sheets-Sheet 1

Inventor,
George H. Dowty

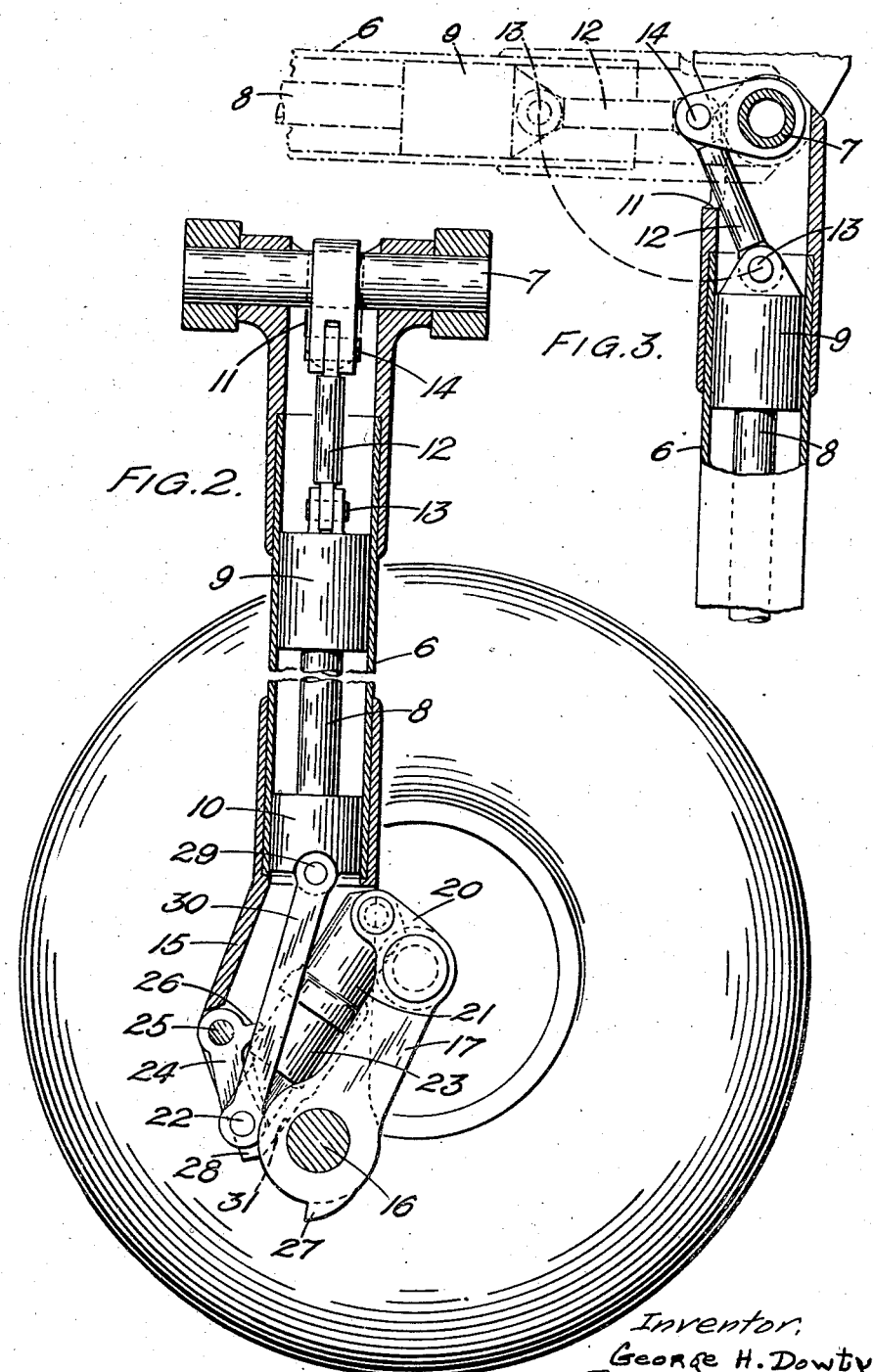

May 18, 1943.　　　　G. H. DOWTY　　　　2,319,446
RETRACTABLE UNDERCARRIAGE FOR AIRCRAFT
Filed March 4, 1940　　　3 Sheets-Sheet 3
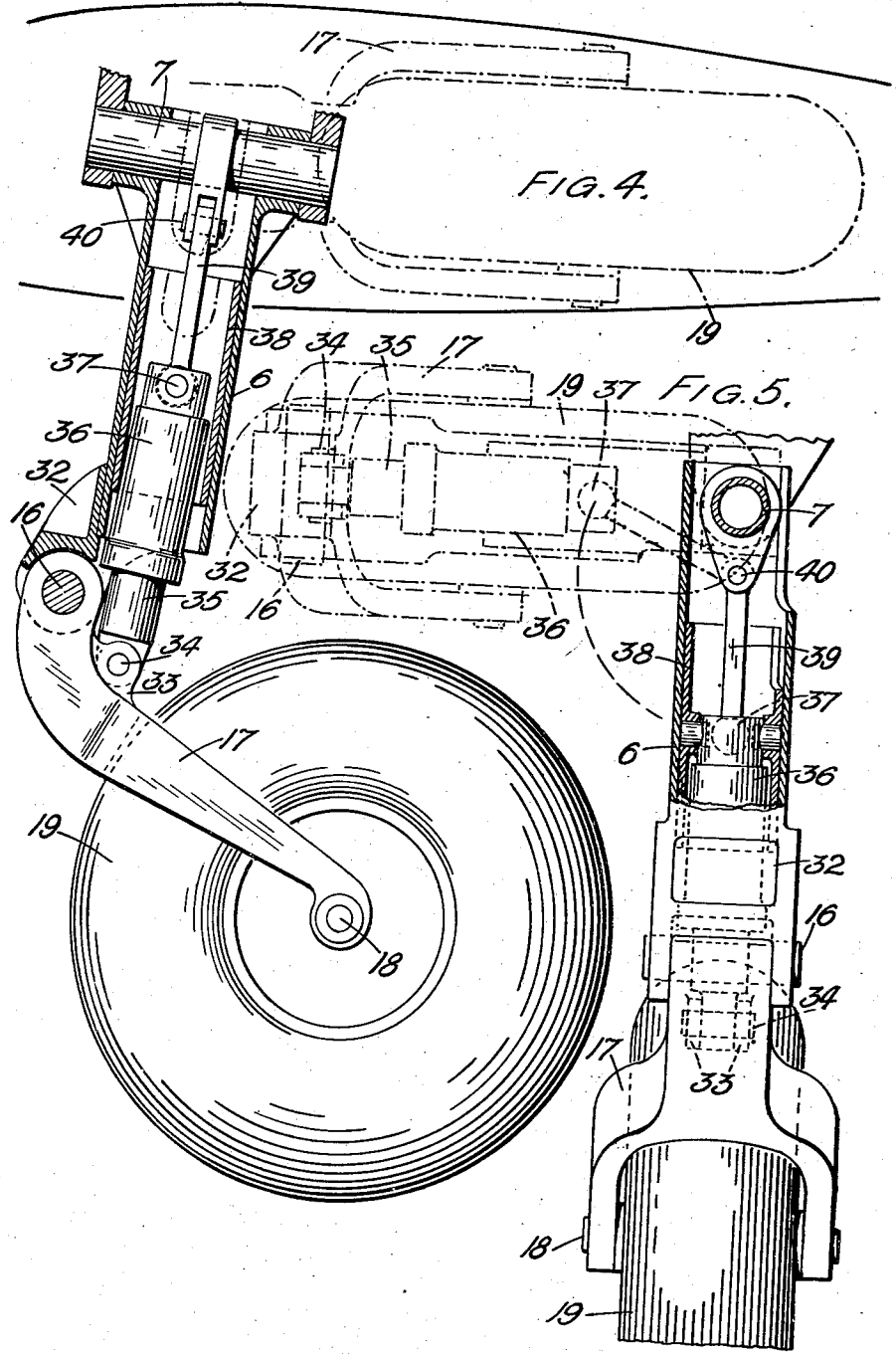

Patented May 18, 1943

2,319,446

UNITED STATES PATENT OFFICE 2,319,446

RETRACTABLE UNDERCARRIAGE FOR AIRCRAFT

George Herbert Dowty, Arle Court, Cheltenham, England

Application March 4, 1940, Serial No. 322,182
In Great Britain March 31, 1939

14 Claims. (Cl. 244—102)

This invention relates to retractable elements of alighting gear for aircraft and is concerned especially with the kind of alighting gear in which a leg or equivalent structural element has extending from its resilient mounting means comprised by a pivoted lever or deformable frame which in turn carries a landing element such as a wheel, swing of the lever or deformation of the frame being resisted by shock-absorber means. Examples of such arrangements in general are set out in U. S. Patent No. 2,174,315 and the co-pending applications Serial Nos. 273,241 and 273,624.

An object of this invention is to afford a retraction arrangement in which the overall dimensions, especially in regard to length of a leg and wheel combination, are decreased during retraction, to reduce stowage space or avoid awkward structural problems in the aircraft. Another object is to afford some degree of self-locking in the down position in a retractable undercarriage; and a further object is to utilise space which may otherwise be wasted and to preserve externally clean forms.

According to this invention, an element of aircraft alighting gear of the kind referred to in which the landing element and its resilient mounting means are movable relative to the leg in a retraction operation. Preferably, the shock-absorber means affording the resilience of the resilient mounting means, instead of being directly pivotally attached to the leg or equivalent is attached through the medium of a link with which the shock-absorber is more or less aligned normally, which link is swung relatively to the leg as the leg swings for retraction. The link is swung by a connection such as a rod, which runs up through the leg and is pivotally anchored to the aircraft eccentrically of the leg bearing, so that swinging of the leg about its bearing moves the rod longitudinally in the leg, swings the link, thus moves the shock-absorber, and so in turn shifts the wheel-carrying lever.

In order to avoid the rod or equivalent having to transmit a component of the working loads in the shock-absorber, the link may come against a stop in the leg, preferably over a dead-centre such that in no position does the shock-absorber apply any load to the link except such as is met by the stop. Where this arrangement is adopted when working loads in the shock-absorber, such as the load in landing, may tend to force the link into its proper "down" position, and if the alighting gear were not fully extended and locked this force may complete the operation and in any case its tendency is to extend rather than to collapse the alighting gear.

In order that it may be clearly understood and more readily carried into effect, the invention is hereinafter described with reference to the accompanying diagrammatic drawings, of which:

Figure 1 is a side elevation mainly in section showing in an extended condition an undercarriage leg in accordance with the present invention;

Figure 2 corresponds to Figure 1 and again shows a side elevation of the leg illustrating the parts in a relationship which they assume in a fully retracted condition;

Figure 3 is a fragmentary sectional elevation looking in the direction of the arrow of Figure 1, showing the anchorage of the means by which the lever arrangement, landing element and associated shock-absorber are moved bodily in retraction, the parts being indicated in full lines in a fully-extended condition and in chain lines respectively in a partly-retracted condition, and finally in a fully-retracted condition;

Figure 4 corresponds to Figure 1 and shows a modified arrangement; whereas

Figure 5 corresponds to Figure 3 but deals with the arrangement shown in Figure 4.

Dealing first with Figures 1 to 3, the reference numeral 6 indicates a tubular leg which for retraction swings up about the retraction pivot 7. Slidable axially of the tubular leg 6 is a rod 8 borne in blocks 9 and 10. There is an opening 11 in the wall of the leg 6 through which projects the rod 12 one end of which is connected to the pivot 13 of the block 9, whereas the other end swings about the fixed pivot 14, which is spaced from the retraction pivot 7 but is parallel thereto. At the lower end the leg 6 has a channel-section fitting 15 supporting on a pivot 16 a trailing lever 17, which in turn carries the wheel 19. To a lug 20 at axle 18, mounting the wheel 19. To a lug 20 at the trailing end of the lever 17 is pivoted the cylinder 21 of a telescopic shock-absorber which extends substantially parallel with the lever 17 forwardly towards the leg fitting 15. To the pivot 22 on the plunger 23 of the shock-absorber is pivoted a short link 24 which extends again forwardly (normally approximately in alignment with the plunger 23) to the pivot 25 by which it is attached to the channel fitting 15. The reference numeral 26 indicates a movable abutment which cooperates with the channel part 15 to limit upward swinging of the link 24. Likewise, the movable abutment 27 which cooperates with the fixed abutment 28 defines the extreme "down" position for the trailing end of the lever 17. The block 19 carries the pivot 29 between which and the pivot 22 of the plunger of the shock-absorber there extends the rigid connecting link 30.

When the undercarriage is extended the landing and shock-absorbing loads cause the lever 17 to swing up and down about the pivot 16, the shock-absorber being deflected in compression and extension.

When the aircraft is air-borne the lever 17 is right down in the position determined by the cooperating abutments 27 and 28.

As stated, the pivot 14 is fixed and consequently as the leg swings in retraction about the pivot 7 the distance between the pivots 13 and 7 is varied, being longer in the fully-retracted condition (due to the spacing of the pivots 14 and 7) than it is in the fully-extended condition. The result of that difference is to force the rod 8 together with its bearing blocks 9 and 10 and the connecting link 30 outwards in relation to the retraction pivot 7, which action in turn forces the pivot 22 downwardly so that the lever 17 is swung upwards about its pivot 16. It will be appreciated that as the pivot 22 moves downwardly the lever 17 has swung up about its pivot 16 enough to enable the pivot and associated adjacent parts to clear the upper part of the lever 17, which may if necessary be flattened, as indicated at 31.

The nature of the movement which the lever 17 makes in relation to the leg 6 and the rest of the structure in retraction has the effect of at least partly nesting the lever together with the shock-absorber in the channel fitting 15, with a consequent reduction not only in the length of the leg but also in the distance between the extreme rear point of the wheel and the lower end of the leg structure.

It will be observed that in the position shown the axis of the shock-absorber 23, the pivot 22 and the pivot 25 are in line. Such an arrangement is particularly desirable in order to avoid landing and shock-absorbing loads being transmitted through the link 30 to the internal mechanism of the leg.

The arrangement illustrated quite easily affords a shortening of overall length for retraction equal to the maximum shock-absorber stroke of the wheel, and even greater degree of shortening may be achieved.

Referring now to the arrangement shown with reference to Figures 4 and 5, the general function although in some respects operating in an opposite manner to that of the arrangement shown with reference to Figures 1 to 3 serves eventually the same object. It will be seen that the tubular leg has an offset fitting 32 which may be of channel form but in any event is the equivalent of the fitting shown in Figures 1 and 2. Likewise, the fitting 32 carries the pivot 16 about which the trailing lever 17 swings. The trailing lever 17 is provided at a point near the pivot 16 with the lug 33 incorporating the pin joint 34 to which the plunger 35 of the shock-absorber is pivoted. The plunger 35 extends up into the tubular leg 6 and is slidably received by the cylinder 36, the plunger 35 and the cylinder 36 cooperating to comprise a telescopic shock-absorber. The end of the cylinder 36 remote from the plunger incorporates a gudgeon pin assembly 37 by means of which the cylinder 36 is attached both to the sleeve 38 and to the rod 39, which is virtually the equivalent of the rod 12 in the arrangement shown with reference to Figure 1 to 3. It will be observed, particularly by reference to Figure 5, that the operation of the present arrangement is here exactly the opposite of that previously described, for whereas in the said previous arrangement the internal mechanism housed within the tubular leg 6 moves radially away from the retraction pivot 7 during retraction, the mechanism in the present arrangement is caused to approach the retraction pivot 7 as the leg 6 swings up. It will be observed that the distance between the gudgeon pin assembly 37 and the retraction pivot 7 is greatest with the leg in the fully-extended condition owing to the fact that in that condition the pivot point 40 for the connecting rod 39 is spaced vertically under the retraction pivot 7, which is fixed as is the corresponding pivot 14 referred to in connection with the arrangement shown in Figures 1 to 3.

When the leg shown in Figures 4 and 5 is retracted the internal mechanism together with the shock-absorber is pulled into the tubular leg 6 with the result that the trailing end of the lever 17 together with the wheel axle 18 and wheel 19 is drawn up so that the free end of the lever is caused to approach the axle of the leg 6 in exactly the same way as in the previously-described arrangement.

In all the examples shown the resilient mounting means are duplicated to afford bilateral support to the landing element; the lever 17 being forked as indicated in Figure 5 so as to embrace the wheel. The arrangement may afford merely unilateral engagement with the wheel axle, and if bilateral support is to be afforded in an arrangement as illustrated in Figures 1 to 3, the leg 6 can be duplicated in a lateral sense and appropriately braced laterally if required.

It will be apparent from the drawings and description that by reason of the fact that the connection of the internal mechanism of the leg with the lever is disposed quite close to the pivot about which the lever swings, a relatively small movement at the said point of connection affords a very much larger movement for the wheel or equivalent landing element. Likewise, it will be observed that in both arrangements described the shock-absorber is so disposed that it partakes of movement which is small relative to a corresponding displacement of the associated landing element.

It may be mentioned that it is convenient to employ for retraction and/or for locking the undercarriage in an extended and/or retracted condition a breakable radius rod operable by jack or equivalent means for retraction and/or extension and for locking in known manner.

What I claim is:

1. A retractable element of aircraft alighting gear including a rigid retractable leg non-deformable during retraction or extension thereof, a resilient deformable frame extending therefrom for movement up and down under landing or taxiing loads, a landing element carried by said frame, means on said leg for pivotally mounting the same upon an aircraft, pivot means spaced from but closely adjacent said mounting pivot means, and means connecting said last mentioned pivot means and said frame for collapsing said frame to move said landing element with respect to said leg upon rotation of said leg about said mounting pivot during retraction or extension thereof.

2. A retractable element of aircraft alighting gear including a rigid retractable leg non-deformable during retraction or extension thereof, pivotally mounted lever means extending from said leg for swinging up and down with respect to said leg during landing and taxiing of the aircraft, a landing element carried by said lever, means on said leg for pivotally mounting the same upon an aircraft, a link pivotally mounted adjacent said mounting pivot, shock absorber means affording resilience to said lever, and means including said shock absorber for interconnecting said lever and said link for swinging said lever with respect to said leg when said leg is rotated about said mounting pivot for extension movement.

3. A retractable element of aircraft alighting gear including a rigid retractable leg non-deformable during retraction or extension thereof, pivotally mounted lever means extending from said leg for swinging up and down with respect to said leg during landing and taxiing of the aircraft, a landing element carried by said lever, means on said leg for pivotally mounting the same upon an aircraft, a link pivotally mounted adjacent said mounting pivot, shock absorber means affording resilience to said lever, and link means including said shock absorber for interconnecting said lever and said first mentioned link for swinging said lever with respect to said leg when said leg is rotated about said mounting pivot or extension movement, said shock absorber being positioned in substantial axial alignment with one of said link means when said leg is in extended postion to absorb shock forces.

4. An element of aircraft alighting gear including a retractable leg having a connection providing a retraction pivot for the same when the gear is mounted, resilient mounting means extending from said leg, a landing element carried by said resilient mounting means, a link pivoted to said leg, telescopic shock-absorber means for affording resilience to said mounting means substantially in alignment with said link in an extended condition of the gear, means for securely defining the position of said link in the extended condition and connecting means, housed at least partly in said leg, extending between said link and a pivot spaced from said retraction pivot to swing relatively said link and said shock absorber means whereby to effect movement of said resilient mounting means in a retraction operation.

5. A retractable element of aircraft alighting gear including a retractable leg, a link pivoted to said leg, resilient mounting means extending from said leg comprised by a lever pivoted to the leg and telescopic shock-absorber means extending between a lug on said lever and said link, said shock absorber means thereby being spaced in relation to said lever and constituting therewith a deformable frame, a landing element carried by said deformable frame, stop means substantially axially aligning said link with said telescopic shock absorber means in an extended condition of the gear and means connected through said link to swing relatively said link and shock absorber means whereby to effect movement of the said resilient mounting means in a retraction operations.

6. A retractable element of aircraft alighting gear including a tubular leg, a lever pivotally extending from said leg, a landing element carried by said lever, shock absorber means housed in said leg to afford resilient resistance to swinging of said lever with respect to said leg and means for sliding said shock absorber relatively to said tubular leg whereby to effect movement of said lever in a retraction operation.

7. An element of aircraft alighting gear including a tubular leg having a connection affording a retraction pivot when the gear is mounted, a lever extending from said leg, a landing element carried by said lever, resilient shock-absorber means extending between said lever and sleeve means slidable in said leg, a connecting rod extending between the assembly comprised by said sleeve means and the interconnected end of said shock absorber means, and a pivot spaced from said retraction pivot to move said sleeve means and associated shock absorber means relatively to said leg, whereby to effect movement of said lever and landing element in a retraction operation.

8. A retractable element of aircraft alighting gear including a leg non-distortable during its retraction and extension movement, a landing element, an articulated frame connecting said landing element to said leg, shock absorber means in said frame to afford resilient resistance to deformation of said articulated frame under landing and taxiing loads, and means for moving said articulated frame relative to the leg in a retraction operation.

9. A retractable element of aircraft alighting gear including a leg non-distortable during its retraction and extension movement, lever means pivotally connected to said leg, a landing element carried by said lever means, a link pivoted to said leg, shock-absorber means connected to said lever and said link from a strut to resiliently resist swinging of said lever under landing and taxiing loads thereby, and means connected to said link for swinging said lever relative to said leg in a retraction operation.

10. A retractable element of aircraft alighting gear including a leg non-distortable during its retraction and extension movement, pivot means on said leg, lever means carried by said pivot means for movement up and down during landing or taxiing, a landing element carried by said lever means, a link pivoted to said leg above said lever, telescopic shock absorber means pivotally connected to said link and said lever means and axially aligned with said link when said leg is in extended condition, means carried by said link for securely defining the position of said link in the extended condition of the leg, and means connected to and acting through said link to swing said link and shock absorber means whereby to effect movement of said lever relative to said leg during retraction operation thereof.

11. An element of aircraft alightin. gear including a leg non-distortable in retraction and extension movement having a connection affording a retraction pivot when the gear is mounted, lever means pivotally connected to said leg, a lending element carried by said lever means, a link pivoted to said leg, telescopic shock absorber means connected between said link and said lever for affording resilient resistance to swinging movement of said lever and substantially in alignment with said link in an extended condition of the leg, means for securely defining the position of said link in the extended condition, and connecting means, housed at least partly in said leg, extending between said link and a pivot spaced from said retraction pivot to swing relatively said link and said shock absorber means whereby to effect movement of said lever relative to the leg means in a retraction operation.

12. A retractable element of aircraft alighting gear including a leg non-distortable in retraction and extension movement, a link pivoted to said leg, resilient mounting means extending from said leg comprised by lever means pivoted to the leg and having a lug on one end and telescopic shock absorber means extending between said lug on said lever means and said link, said shock absorber means thereby being spaced in relation to said lever and constituting therewith a deformable frame, a landing element carried by said deformable frame, stop means substantially aligning said link with said telescopic shock absorber means in an extended condition of the leg, and means connected to and acting through said link to swing said link and shock absorber means whereby to effect movement of the said resilient mounting means relative to said leg in a retraction operation.

13. A retractable element of aircraft alighting gear including a tubular leg non-distortable during its retraction and extension movement and having a connection affording a retraction pivot when the gear is mounted, a pivot spaced from said retraction pivot, lever means pivotally extending from said leg for swinging relative thereto when said leg is in extended position, a landing element carried by said lever means, shock absorber means housed in said leg to afford resilient resistance to swinging of said lever means with respect to said leg, and means interconnecting said shock absorber means and said last mentioned pivot for sliding said shock absorber relative to said tubular leg whereby to effect movement of said lever means relative to said leg in a retraction operation.

14. An element of aircraft alighting gear including a tubular leg non-distortable in retraction and extension movement and having a connection affording a retraction pivot when the gear is mounted, lever means extending from said leg, a landing element carried by said lever means, sleeve means slidable in said leg, resilient shock absorber means connected to said lever and said sleeve means, a pivot spaced from said retraction pivot, a connecting rod extending between the shock absorber and sleeve assembly and said pivot spaced from said retraction pivot whereby said sleeve means and associated shock absorber means are moved relatively to said leg, during a retraction operation to effect movement of said lever means and landing element relative to said leg during the retraction operation.

GEORGE HERBERT DOWTY.